United States Patent
Owens et al.

(10) Patent No.: US 9,898,702 B2
(45) Date of Patent: Feb. 20, 2018

(54) METHOD, COMPUTER PROGRAM PRODUCT, AND APPARATUS FOR MANAGING DECISION SUPPORT RELATED EVENT INFORMATION

(75) Inventors: Kenneth G. Owens, University City, MO (US); William E. Krechel, St. Louis, MO (US); Brian N. Slack, Lebanon, IL (US)

(73) Assignee: The Boeing Company, Chicago, IL (US)

( * ) Notice: Subject to any disclaimer, the term of this patent is extended or adjusted under 35 U.S.C. 154(b) by 2127 days.

(21) Appl. No.: 11/554,784

(22) Filed: Oct. 31, 2006

(65) Prior Publication Data
US 2008/0103845 A1  May 1, 2008

(51) Int. Cl.
*G06Q 10/00* (2012.01)
*G06Q 10/06* (2012.01)

(52) U.S. Cl.
CPC .......... *G06Q 10/00* (2013.01); *G06Q 10/063* (2013.01); *G06Q 10/0631* (2013.01); *G06Q 10/0637* (2013.01)

(58) Field of Classification Search
CPC .. G06Q 10/00; G06Q 10/06315; G06Q 10/08; G06Q 10/063; G06Q 10/0631; G06Q 10/0637
USPC ........................................................... 705/8
See application file for complete search history.

(56) References Cited

U.S. PATENT DOCUMENTS

| | | | |
|---|---|---|---|
| 5,216,612 A * | 6/1993 | Cornett et al. | 700/96 |
| 6,167,401 A * | 12/2000 | Csipkes et al. | |
| 7,171,379 B2 | 1/2007 | Menninger et al. | |
| 7,251,614 B1 * | 7/2007 | Li | 705/10 |
| 7,277,862 B1 * | 10/2007 | Adgaonkar et al. | 705/8 |
| 7,461,008 B2 * | 12/2008 | Garrow et al. | 705/8 |
| 7,546,253 B2 * | 6/2009 | Andersson et al. | 705/26 |
| 7,664,674 B2 * | 2/2010 | Negron | 705/26 |
| 2002/0052862 A1 * | 5/2002 | Scott et al. | 707/1 |
| 2002/0198794 A1 * | 12/2002 | Williams et al. | 705/28 |
| 2003/0149578 A1 * | 8/2003 | Wong | 705/1 |
| 2004/0186839 A1 * | 9/2004 | Smith | 707/100 |

* cited by examiner

*Primary Examiner* — Jonathan G Sterrett
(74) *Attorney, Agent, or Firm* — Alston & Bird LLP (57) ABSTRACT

An apparatus for managing decision support related events and solutions includes a plurality of case management elements. Each of the case management elements is in communication with at least an associated one of a corresponding plurality of portal access controllers associated with a corresponding unit within an organization. Each of the case management elements includes at least a corresponding one of a plurality of solution elements. Each of the solution elements is configured to receive solution information from the at least one corresponding portal access controller and to communicate the solution information only with each other one of the solution elements. The solution information comprises data regarding a decision support related event associated with a case associated with the corresponding unit.

22 Claims, 4 Drawing Sheets

METHOD, COMPUTER PROGRAM PRODUCT, AND APPARATUS FOR MANAGING DECISION SUPPORT RELATED EVENT INFORMATION

FIELD OF THE INVENTION

Embodiments of the present invention relate generally to decision support related information management systems, and more particularly, to the management and sharing of decision support related event information such as event information associated with parts obsolescence or inventory management including, for example, technology insertion issues, supply issues, and other inventory issues.

BACKGROUND OF THE INVENTION

Many large manufacturing companies are enterprises which conduct operations in different geographic regions. Additionally, such companies often have distinct programs or business units within either the same or different geographic regions. For example, an aircraft manufacturer may have separate programs for each type of aircraft the manufacturer produces. Each of the programs may utilize a number of parts or materials which may also be utilized in various other programs. However, despite the fact that similar resources may be utilized by different units or programs, it is common for communication regarding such resources to be lacking.

Given the rapid pace at which technology develops, it is not uncommon for certain parts that may be essential to, or at least utilized in, aspects of several programs to be discontinued by a part manufacturer. Accordingly, the discontinued parts become obsolete, thereby creating a parts obsolescence challenge in which a mitigation strategy must be developed for reducing the impact of the part obsolescence event on the program. When parts obsolescence challenges arise in environments in which programs or business units have developmental "stove pipes" that isolate each program, the programs may each find themselves facing similar challenges without any way to become aware that others are also facing the challenge or that others may have already developed a mitigation strategy from which remaining programs might benefit. Furthermore, since each program or unit may only have a limited requirement for a given part, it may be difficult for any single program to lobby a part manufacturer against discontinuing a given part.

Although many companies have recently focused on enterprise resource planning (ERP) systems which are targeted at increasing productivity throughout an enterprise, no such system currently exists which can effectively overcome the problems described above. Moreover, although certain commercially available tools purport to offer information management such as, for example, TACTRAC, SMART, AVCOM and Q-STAR, these commercially available systems do not extend far beyond merely informing a company that a part is obsolete. Additionally, the commercially available systems typically require a license be taken for each site, however, such systems are not typically open to being tailored to the needs of each site.

Accordingly, in light of the discussion above, it may be desirable to provide a method, system, and computer program product capable of overcoming the problems described above by enabling parts obsolescence information to be shared throughout an enterprise rather than just within particular programs of the enterprise.

BRIEF SUMMARY OF THE INVENTION

In order to improve ERP capabilities with respect to decision support, for example, in relation to parts obsolescence information and to avoid the problems described above, a parts obsolescence case management and solution tool is provided. Embodiments of the present invention employ a parts obsolescence information sharing application. The application may be a web based application, which is capable of providing access to each of various different programs or units within an organization to access parts obsolescence information on an organization wide basis. Accordingly, a searchable database of parts obsolescence information may be provided to each unit and management of parts obsolescence issues may be performed on enterprise level. Thus, information may be compiled across the enterprise and used, for example, for leveraging such information in discussions with parts suppliers regarding part discontinuation.

In one exemplary embodiment, a method for managing decision support related events and solutions is provided. The method includes multiple operations. The first operation is for receiving data related to a case from a portal access controller of origin. The portal access controller of origin is one of a plurality of portal access controllers associated with corresponding units within an organization. The case is associated with a corresponding unit. The second operation is for receiving solution information related to the case from the portal access controller of origin. The solution information is data regarding a decision support related event associated with the case associated with the corresponding unit. The third operation is for communicating the solution information related to the case only with others among the plurality of portal access controllers.

In another exemplary embodiment, a computer program product for managing decision support related events and solutions is provided. The computer program product includes at least one computer-readable storage medium having computer-readable program code portions stored therein. The computer-readable program code portions include multiple executable portions. The first executable portion is for receiving data related to a case from a portal access controller of origin. The portal access controller of origin is one of a plurality of portal access controllers associated with corresponding units within an organization. The case is associated with a corresponding unit. The second executable portion is for receiving solution information related to the case from the portal access controller of origin. The solution information is data regarding a decision support related event associated with the case associated with the corresponding unit. The third executable portion is for communicating the solution information related to the case only with others among the plurality of portal access controllers.

In another exemplary embodiment, an apparatus for managing decision support related events and solutions is provided. The apparatus includes a plurality of case management elements. Each of the case management elements is in communication with at least an associated one of a corresponding plurality of portal access controllers associated with a corresponding unit within an organization. Each of the case management elements includes at least a corresponding one of a plurality of solution elements. Each of the solution elements is configured to receive solution information from at least one corresponding portal access controller and to communicate only the solution information with other ones of the portal access controllers. The solution information comprises data regarding a decision support related event associated with a case associated with the corresponding unit.

Embodiments of the invention provide an ability to share decision support information such as parts obsolescence information across an enterprise. Additionally, case management information can be stored and accessed by a corresponding unit through a portal access control from any network access station on a network of the enterprise. As a result, productivity of the enterprise may be increased and communication among different programs or units of the enterprise may also be increased.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
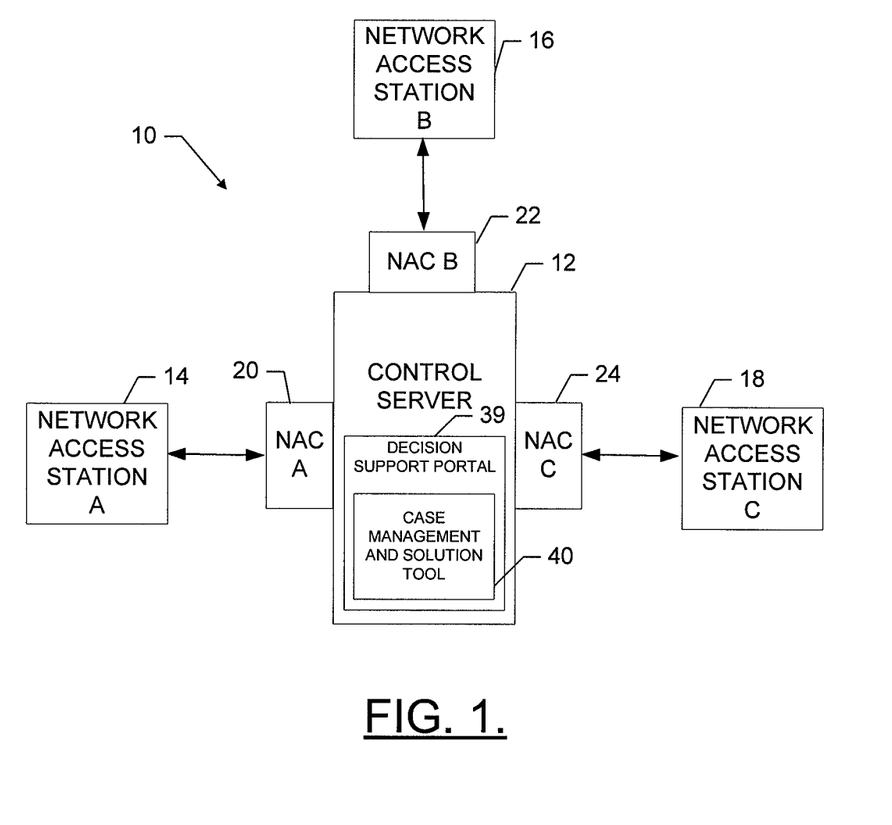
FIG. 1 is a basic block diagram illustrating a system for managing parts obsolescence information or other decision support related event information according to an exemplary embodiment of the present invention.

FIG. 1 is a basic block diagram illustrating a system [10] for managing parts obsolescence or inventory related events (e.g., parts obsolescence events, supply/demand issues, consumables management, etc.) according to an exemplary embodiment of the present invention. It should be noted that while FIG. 1 will be described mainly in the context of parts obsolescence events, many other decision support related events may also be managed by embodiments of the present invention including, but not limited to those mentioned above. As shown in FIG. 1, the system [10] may include a control server [12] and a plurality of network access stations (NAS) (e.g., NAS A [14], NAS B [16], and NAS C [18]). Each of the network access stations [14], [16] and [18] may be in communication with, or capable of communication with, the control server [12]. Communication between the control server [12] and the network access stations [14], [16] and [18] may be achieved via either a wired or wireless connection as is known in the art. As such, the control server [12] and the network access stations [14], [16] and [18] may form a network.

Figure 2:
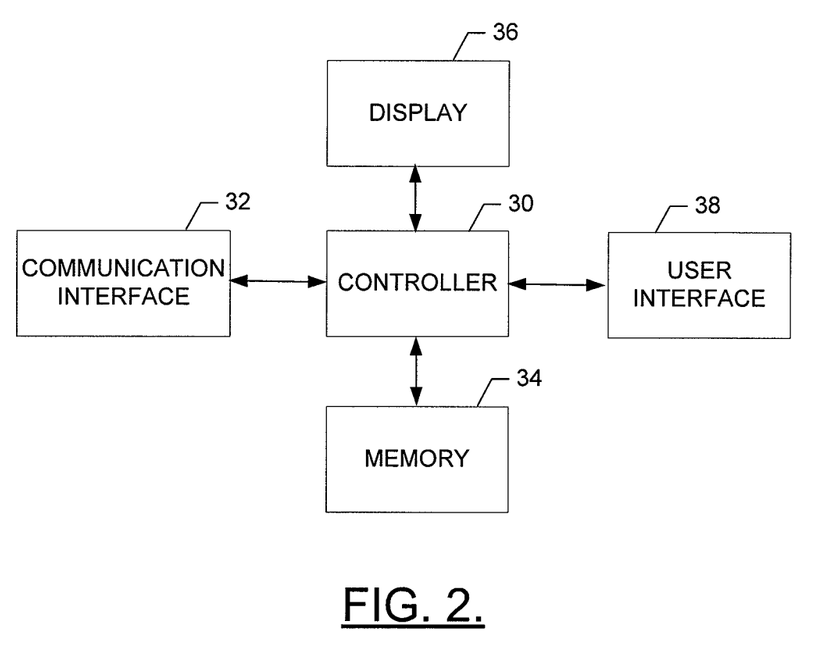
FIG. 2 is a basic block diagram of a computing device according to an exemplary embodiment of the present invention.

In an exemplary embodiment, the control server [12] and the network access stations [14], [16] and [18] may each be embodied as a computing device capable of executing coded instructions stored in a tangible medium for the purpose of performing a particular function in accordance with the instructions. For example, the control server [12] and each of the network access stations [14], [16] and [18] may be configured substantially as shown in FIG. 2. FIG. 2 is a basic block diagram of a computing device according to an exemplary embodiment of the present invention. The computing device may include a processing element such as controller [30], a communication interface element [32], and a memory device [34]. Although not required, the computing device may also include a display [36] and a user interface [38]. In this example, it can be assumed that each of the network access stations is associated with a particular program or unit within an organization. A plurality of programs or units may be dispersed throughout various geographic regions, although such dispersion is not required. The control server [12] may be disposed at a location accessible to each of the network access stations [14], [16] and [18] and may or may not be collocated with one or more of the network access stations [14], [16] and [18].

In an exemplary embodiment, the control server [12] may not include the display [36] or the user interface [38], while the network access stations [14], [16] and [18] may each include each of the elements listed above. In other words, the control server [12] may act as a server and each of the network access stations [14], [16] and [18] may act as a client. As such, the network access stations [14], [16] and [18] may be personal computers, work stations, etc. which may be utilized by a user to perform certain functions locally, and also enable the user to access remote information and execute applications accessible by the network access stations [14], [16] and [18] which may be stored, for example, in the memory device [34] of another portal or the client server. The memory device [34] may be either volatile or non-volatile memory which could be used, for example, to store data. Alternatively or additionally, the memory device [34] may store instructions for execution by the controller [30].

Processing elements such as the controller [30] may be embodied in many ways. For example, the processing elements may be embodied as a processor, a coprocessor, a controller or various other processing means or devices including integrated circuits such as, for example, an ASIC (application specific integrated circuit). In an exemplary embodiment, the controller [30] of the computing device may be configured to execute instructions stored in the memory device [34] or otherwise accessible to the controller [30] in order to process information input at a corresponding one of the network access stations [14], [16] and [18] received via either the communication interface element [32] or the user interface [38] for storage and/or display. Storage may be performed at the corresponding one of the network access stations or at a different network access station or the control server [12]. Display may be performed at the display [36] of the corresponding one of the network access stations or at a different network access station.

The display [36] may be, for example, a conventional liquid crystal display (LCD), a projection display, a cathode ray tube (CRT) display, or any other display device known in the art. The communication interface element [32] may be embodied as any device or means embodied in either hardware, software, or a combination of hardware and software that is capable of receiving data and/or information from other devices and communicating data and/or information to other devices by any known protocol. As such, the communication interface element [32] may include hardware and/or software for receiving obsolescence information for modification, storage, and/or sharing with other devices.

The user interface [38] may include, for example, a keyboard, keypad, mouse, touch screen interface, function keys, or any other mechanism by which a user may interface with the computing device. In an exemplary embodiment, the user may utilize the user interface [38], for example, to requisition information regarding parts obsolescence, or to input information related to parts obsolescence, or to perform various other user selections.

In an exemplary embodiment, the ability of the network access stations [14], [16] and [18] to access the control server [12] may be controlled by corresponding network access control devices. For example, network access station A may access the control server [12] via network access controller A [20], network access station B may access the control server [12] via network access controller B [22], and network access station C may access the control server [12] via network access controller C [24]. The network access controllers [20], [22] and [24] may each be embodied as any device or means embodied in either hardware, software, or a combination of hardware and software that is capable of controlling user access to the control server [12] via security functions such as authorization or authentication. In other words, the network access controllers [20], [22] and [24] may permit users of corresponding ones of the network access stations [14], [16] and [18], respectively, to perform a secure logon to the control server [12]. In an exemplary embodiment, the secure logon may enable the user to access particular applications or functions associated with the control server [12]. For example, the user of network access station A [14] may provide a username and password which corresponds to an authorized user profile and the user may then be granted access to the control server [12] by the network access controller A [20]. Accordingly, the user of network access station A [14] may then access functions associated with the control server [12], which may include an ability to access a portal such as the decision support portal [39]. The decision support portal [39] may then provide users with the capability to perform decision support functions as described in greater detail below. In an exemplary embodiment, a plurality of portals including the decision support portal [39] may be stored on the control server [12]. The portals may include any portals known in the art. For example, each portal may provide access to one or more portlets or tools. In an exemplary embodiment, upon being granted access to the control server [12], a user may have access to the decision support portal [39] in order to execute a case management and solution tool [40]. The case management and solution tool [40] may provide a user with the ability to manage decision support related event information with regard to parts obsolescence or other inventory related information. As such, it should be appreciated that although an embodiment of the present invention will be described specifically in regard to the management of parts obsolescence related event information; parts obsolescence is merely one example of an application to which embodiments of the present invention relate. Accordingly, it should be understood that the case management and solution tool [40] is provided in detail below for purposes of example and not of limitation.

Figure 3:
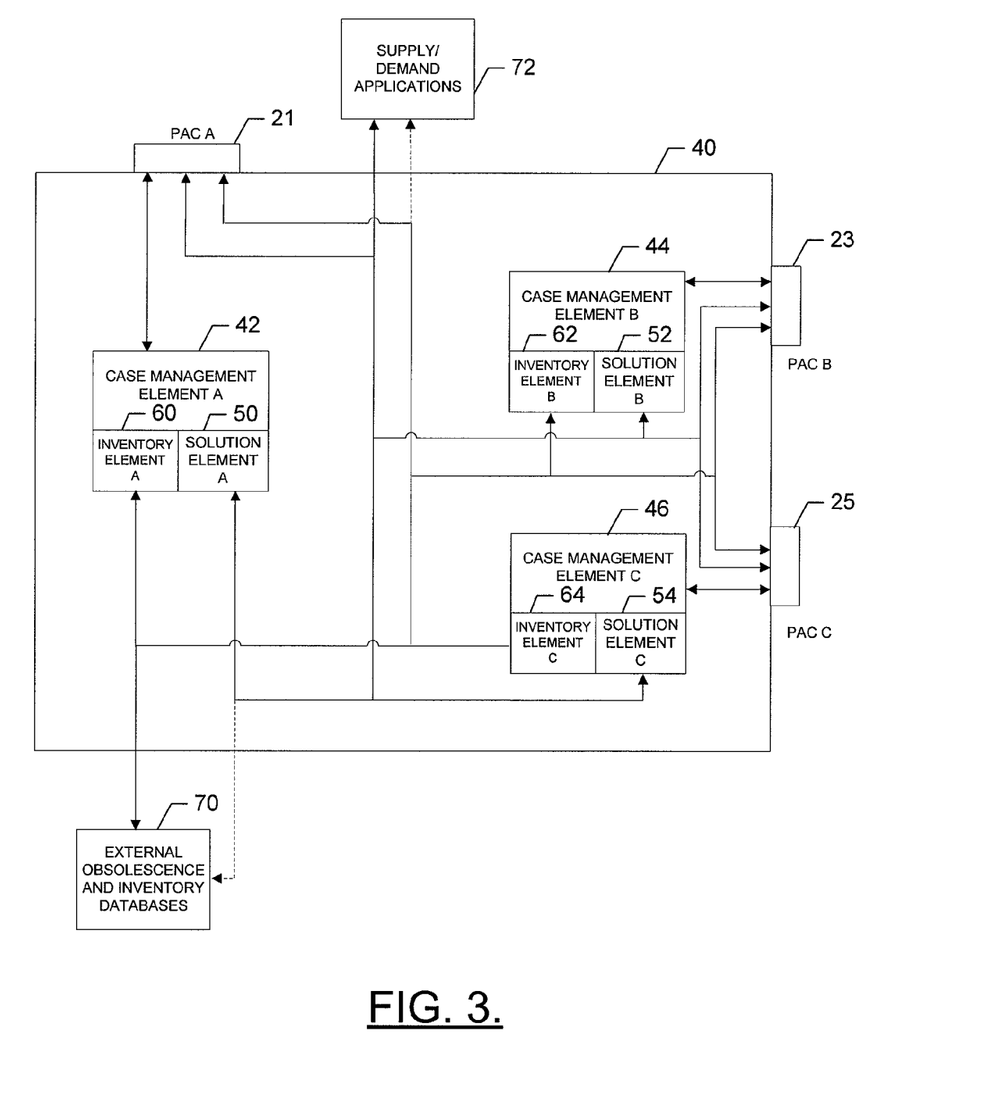
FIG. 3 is a diagram illustrating a schematic block diagram of a case management and solution tool according to another exemplary embodiment of the present invention.

FIG. 3 illustrates a schematic block diagram of the case management and solution tool [40] according to an exemplary embodiment of the present invention. The case management and solution tool [40] may be embodied as any device or means embodied in either hardware, software, or a combination of hardware and software that is capable of managing information related to specific part or material related events and sharing solutions between various units within an organization. In an exemplary embodiment, the case management and solution tool [40] may be embodied as a software application that is stored at the control server [12] but executable from any of the network access stations [14], [16] and [18] in response to a successful secure logon via a corresponding one of the network access controllers [20], [22] and [24], respectively, and by further accessing the decision support portal [39], for example, via a respective portal access controller (PAC) (e.g., PAC A [21], PAC B [23], and PAC C [25]. In this regard, the PACs [21], [23] and [25] may represent an additional layer of access control in order to enable access to only those cases associated with the business unit to which the user is associated. As such, the PACs [21], [23] and [25] may utilize a secure login to identify the user. In other words, the network access controllers [20], [22] and [24] may each be utilized to access a corresponding one of the PACs [21], [23] and [25] in order to access the case management and solution tool [40] within the decision support portal [39]. However, alternatively, the NACs (i.e., network access controllers [20], [22] and [24]) may provide the only secure login to enable access to the case management and solution tool [40]. In other words, in one embodiment, the NACs and PACs may be the same entity.

As shown in FIG. 3, the case management and solution tool [40] may include a plurality of case management elements. Although FIG. 3 shows a first case management element (e.g., case management element A [42]), a second case management element (e.g., case management element B [44]), and a third case management element (e.g., case management element C [46]), it should be understood that any number of case management elements may be included. In an exemplary embodiment, one case management element may be associated with a corresponding one of the network access stations [14], [16] and [18] in which each of the network access stations [14], [16] and [18] corresponds to a particular unit, such as a development program, within an organization. Alternatively, the network access stations [14], [16] and [18] may not necessarily be associated with any particular case management element, but each user profile may correspond to a particular case management element associated with a particular unit such that any given user can only perform certain case management functions for cases that are associated with or originated at the particular unit. In an exemplary embodiment, case management elements may be accessed via a corresponding portal access controller [21], [23], and [25] associated with a respective one of the network access controllers [20], [22], and [24]. In other words, when the user accesses the case management and solution tool [40] via a portal access controller, the portal access controller may connect the user to the case management element that is associated with the user's profile based on the unit with which the user is associated.

Each of the case management elements [42], [44], and [46] may be embodied as any device or means embodied in either hardware, software, or a combination of hardware and software that is capable of receiving information from a corresponding portal access controller in which the information is related to a case associated with part or material (i.e., inventory) obsolescence related events. For example, the case could be associated with a particular part, material, consumable or other resource which may be tracked by a corresponding identifier. The case could provide detailed information that is tailored to the operations of the particular unit associated with the portal access controller of origination for the case. The detailed information regarding a case could include, for example, obsolescence notification information (i.e., date of notice, part number, when notified, etc.), notes, links to solution data, whether the case is active, contact information, etc.

In an exemplary embodiment, each of the case management elements [42], [44] and [46] may include a corresponding solution element (e.g., solution element A [50], solution element B [52] and solution element C [54], respectively). The solution elements may be embodied as any device or means embodied in either hardware, software, or a combination of hardware and software that is capable of receiving solution information associated with inventory related events and is further configured for direct communication (i.e., transmitting and receiving solution information) with only other case management elements and typically only with other solution elements. Accordingly, although case information entered by a corresponding unit associated with each of the case management elements [42], [44] and [46] is not visible to units other than the unit of origin, in an exemplary embodiment, the solution elements [50], [52], and [54] provide for a mechanism by which solution related information, which may be valuable proprietary information that is desirable to be kept private relative to entities outside the organization, may be freely shared within the organization, but incapable of being shared outside the organization.

In an exemplary embodiment, as shown in FIG. 3, a hypothetical user A may access the case management and solution tool [40] via portal access control A [21] after executing a secure logon (e.g., via the network access controller A [20] of FIG. 1). User A may then access the case management element A [42] in order to establish a case. The case may be associated with a particular inventory item such as a part, piece of equipment, material, etc. In an exemplary embodiment, each case may include a particular identifier such as a vendor part number, equipment ID, national stock number, company part or material identification number, obsolescence notification date, or any other identification associated with the particular inventory item. The case management element A [42] may provide the user with, for example, an interface control console or a web page with fields, drop down menus, function buttons, or other such mechanisms for enabling the user to enter information associated with the case. The user may then select from among certain functions and/or forms that the case management element A [42] may provide. For example, the user may select a particular case management form or activate a function button to access the solution element A [50].

In an exemplary embodiment, user A may identify an existing case, or create a new case, by putting the identifier of an inventory item in a data entry field of a generic case management form. If the identifier is associated with an existing case, an existing case management form corresponding to the existing case may be retrieved, for example, from the control server [12]. The existing case management form may include, for example, additional fields for data entry that may or may not be previously filled in. For example, the existing case management form may include fields, drop down menus, etc. for users to utilize in order to enter, for example, detailed case history information such as a text narrative indicating user or unit specific data, memo information, contact information for supervisors or subject matter experts, action items due by the unit, the organization, or an external entity such as the government, and corresponding due dates for the action items all of which are associated with a particular case. If, alternatively, the identifier is not associated with an existing case, then a new case will be created on a new case management form. The new case management form may be substantially identical to the existing case management form except that the new case management form may not have any previously filled in information associated with it. Data and/or information associated with any case management form may be modified, added, edited, etc. and subsequently saved so that it may be accessed at a later time by the case management element A [42]. In an exemplary embodiment, case information (i.e., case management forms) may only be accessed by entities associated with the case. In other words, if portal access controller A [21] is associated with a particular unit that is associated with case management element A [42], then only other users associated with the particular unit may access the case management forms stored in association with the case management element A [42].

As stated above, the case management element A [42] may also provide access to the solution element A [50], which may allow user A to access existing solution forms or generate new solution forms. The solution forms, similar to the case management forms, may be associated with a particular identifier and may be accessed or created in a fashion similar to that described above with respect to case management forms. The solution forms, however, include certain information that is not included on the case management forms and, which may be accessed by users associated with different case management elements and different units within the organization. For example, the solution forms may include part or material identifiers and contact information for supervisors or subject matter experts (which may be included also in the case management forms) and/or obsolescence notification date and solution related information such as mitigation strategy information (which are not included in the case management forms).

Accordingly, for example, user A may access the solution element A [50] in order to create a new solution related to a particular part for which a notice of obsolescence has been received. User A may then enter a narrative regarding how unit A developed and implemented a mitigation strategy related to the particular part and other information such as the impact of the part on any programs unit A is engaged in (i.e., is the particular part a critical item), a bulk amount of excess inventory associated with the particular part, contact information and any other pertinent data. The existing solution form may then be accessed by users associated with the case management element A [42], which may have authority to modify, edit and/or add information to the existing solution form, or the existing solution form may be accessed in a read only capacity by other users within the organization via their corresponding portal access controllers by utilizing the corresponding solution element to communicate with solution element A [50] to access the existing solution form.

In an exemplary embodiment, a case management form or a solution form could be, for example, a Microsoft Excel or Word document. Accordingly, a previously existing database of cases could be uploaded to the control server [12] for entry as separate cases via a single mass data transfer. Thus, a particular unit having previously existing case information in a separate database may easily transfer such information to the control server [12]. Additionally, each of the network access stations [14], [16] and [18] may be capable of exporting or printing any forms. Thus, for example, a solution form produced at solution element A [50] could be downloaded as an Excel document at solution element B [52] where the solution form could be edited to be tailored to the desires of the user of solution element B [52] and then stored as a solution form within solution element B [52]. Accordingly, the user of a particular solution element may access a solution form generated elsewhere and, although the user cannot alter the original solution form, the user may export a copy of the original solution form, which can be altered and subsequently saved by the user in association with the user's particular solution element.

Additionally, each of the solution elements [50], [52] and [54] may include a searching function which is configured to receive a search query from a corresponding network access station [14], [16], and [18], respectively, in order to enable users to search for solution information which other units within the organization may have developed. Thus, for example, if user A created a solution form associated with part number 123456, user A may describe solution information such as the mitigation strategy employed by unit A on the solution form or other information useful for effective business case analysis. User B may later access the case management and solution tool [40] by logging in to portal access controller B in order to access the solution element B [52] to input a search criterion for conducting a search utilizing the solution element B [52]. In the present example, the search criteria may be part number 123456. However, other search criteria could be used to refine the search such as, for example, a part obsolescence date, or date ranges. Furthermore, wild card searches or searches limited by program or unit may also be performed. Upon entry of the part number 123456, the solution element B [52] may communicate the query to other solution elements including the solution element A [50] and the solution element C [54] in order to retrieve solution forms from the other solution elements which are associated with part number 123456 and meet the search criteria. In the present example, the solution form user A created above may be retrieved by the solution element B [52] and displayed to user B. User B may then, for example, review mitigation strategy information which unit A recorded and contact information for individuals within unit A who may be consulted regarding the solution form.

Accordingly, cases may be developed for each parts obsolescence or inventory related event by each unit within an organization. The cases may be managed by the unit and are not accessible to other units since each unit may have very distinct case management techniques (and even distinct case management forms) since the programs associated with each unit may be very different. However, each unit may also share solution information with other units since, despite the fact that the units may work on entirely different programs, they may use common parts or materials and therefore face similar mitigation challenges when a particular common part becomes obsolete. In other words, general case information may be distinct to a unit and not useful to other units or of a nature that is not beneficial to share with other units. Meanwhile, the solution information could be beneficial to other units and thus is shared between all units. Additionally, each unit may be enabled to search for solution information which other units may have produced so that information related to parts obsolescence or inventory related events can be shared on an organization or enterprise wide level.

Although the embodiment described above with reference to FIG. 3 generally portrays a private network in which solution information is shared only between a plurality of solution elements associated with various units within an organization, while more unit specific case information is maintained privately in association with each of the units, it is also possible to incorporate functions into the case management and solution tool [40] by which external sources may be accessed. In this regard, FIG. 3 also illustrates a schematic block diagram of a case management and solution tool according to another exemplary embodiment of the present invention. In general, links to external elements shown in FIG. 3 enable resources outside the organization to be utilized with respect to case management and solution development for particular parts obsolescence or inventory related events.

Another element of FIG. 3 is the case management and solution tool [40] and may further include a plurality of inventory elements associated with each of the case management elements. For example, case management element A [42] may include an inventory element A [60], case management element B [44] may include an inventory element B [62], and case management element C [46] may include an inventory element C [64]. Each of the inventory elements [60], [62] and [64] may be embodied as any device or means embodied in either hardware, software, or a combination of hardware and software that is capable of providing inventory search and data mining functions as described in greater detail below. Each of the inventory elements [60], [62] and [64] may be configured to communicate with other inventory elements and certain approved information sources outside the organization. For example, as shown in FIG. 3, the inventory elements [60], [62] and [64] may communicate with external obsolescence and/or inventory data bases [70]. In this regard, the external obsolescence and/or inventory databases [70] may automatically provide obsolescence data or other inventory related information to the case management and solution tool [40] to inform each unit of, for example, the obsolescence of a particular part via the unit's corresponding case management element.

Alternatively, a user associated with a particular case management element may utilize the corresponding inventory management element to perform data mining by searching the external obsolescence and/or inventory data bases [70]. Data mining may be performed at each corresponding inventory element by utilizing search functionality or simply by providing links to external databases. For example, information related to a particular case or item specified in a case management or solution form may be inserted as a search term and the external obsolescence and/or inventory data bases [70] may be searched for references to such information which could include, for example, obsolescence dates, alternative part numbers, alternative manufacturers, and/or contact information for manufacturers. Alternatively, links (which may themselves be updated over time) may be provided to external databases where part numbers may be checked. The external databases may be organized by supplier, manufacturer, etc. and may be web pages associated with suppliers, manufacturers or other resources internal to the organization. Accordingly, managers in particular units may proactively search for parts status information related to critical parts before any obsolescence notification is received. As such, supply data may be queried in advance and program owned inventory may be effectively managed. Additionally, parties who have excess inventory of critical parts may be identified since such parties may have previously engaged in a life-time or bridge buy in order to acquire the excess parts.

As another example of information sources external to the organization which may be in communication with the case management and solution tool [40], the inventory elements [60], [62] and [64]; or the solution elements [50], [52], and [54]; may communicate with a supply and demand application [72]. For example, if a particular part is utilized by a number of different units that have seen an increased demand for the particular part, the increase in demand could create a supply/demand problem if increased supply is not readily available. As such, the problem could be redundantly mitigated at each of the different units of the organization. However, by utilizing embodiments of the present invention, supply/demand problems could be identified on a unit wide basis and mitigation strategies or other solutions may be shared among the units of the organization thereby improving organization and unit productivity by reducing duplication of efforts. As such, the inventory elements [60], [62] and [64]; or the solution elements [50], [52], and [54]; may interface with external supply and demand applications, or with applications within the organization that track external supply issues and internal demand issues in order to track and/or manage supply/demand data to reduce potential availability problems. As such, usage rates, or fill rates, and other information that may be useful in determining lot buying requirements may be analyzed. The supply and demand information may relate to consumable items, repairable items, program owned data, etc.

In another exemplary embodiment, a search may be conducted for pedigree information related to a particular part. For example, if the particular part has an unknown pedigree (e.g., unknown quality assurance data), a search may be conducted using external and/or internal sources via any one of the inventory elements [60], [62] and [64]; or the solution elements [50], [52], and [54]. As such, embodiments of the present invention may function as a revision control application for pedigree information. For example, a case may be established by a particular unit for a part having an unknown pedigree. The particular unit may then undertake testing in order to qualify the part and give it an organizational pedigree. Qualification data regarding the part may be shared with other units of the organization via the inventory elements [60], [62] and [64]; or the solution elements [50], [52], and [54]. As such, when another unit performs data mining to uncover information about the part, for example via a search, the qualification data generated by the particular unit that performed the testing will be made available to the other unit. Thus, resources of the other unit, and of the organization as a whole, may be conserved since duplication of the efforts of the particular unit that performed the testing will not be necessary.

Accordingly, embodiments of the present invention enable utilization of information "behind the firewall" of a particular company, such that successes in development of mitigation strategies or other solutions for dealing with parts obsolescence or inventory related events may be leveraged across the entire company. Additionally, since information, such as obsolescence data may be incorporated into inventory management at the company level, the company can use company wide information as leverage in discussions with suppliers so that certain parts may not actually be discontinued by the supplier based on the company wide demand for a particular part.

Figure 4:
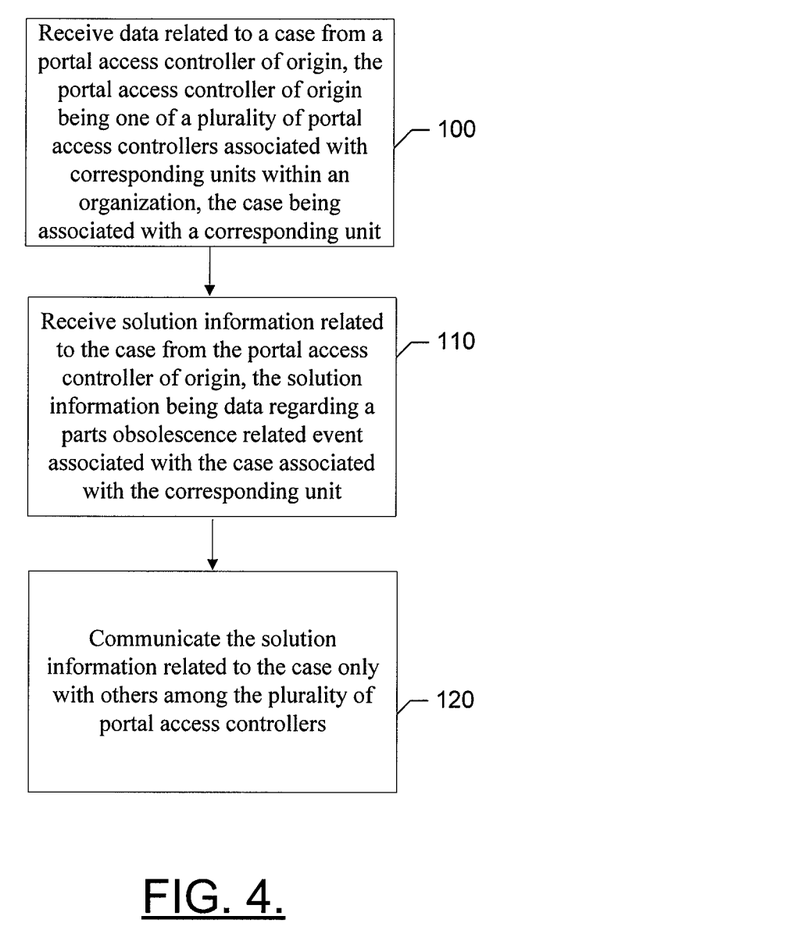
FIG. 4 is a flowchart according to an exemplary method of providing management of decision support related events according to one embodiment of the present invention.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a computing device, such as the control server or the portals, and executed by a built-in processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing management of inventory related events, as shown in FIG. 4, includes receiving data related to a case from a portal access controller of origin at operation [100]. The portal access controller of origin may be one of a plurality of portal access controllers associated with corresponding units within an organization. The case may be associated with the portal access controller of origin. In an exemplary embodiment, case management data received from the portal access controller of origin may thereafter only be accessible by the portal access controller of origin. At operation [110], solution information related to the case is received from the portal access controller of origin. The solution information may be data regarding parts obsolescence or inventory related events associated with the case associated with the corresponding unit. The solution information may be, for example, mitigation strategy information related to a part obsolescence solution. The solution information is communicated or shared only with other ones of the plurality of portal access controllers at operation [120]. The communication or sharing of information at operation [120] may be performed responsive to a search. In an exemplary embodiment, an additional operation of searching for related solution information associated with an identifier of the case in at least one other portal access controller among the plurality of portal access controllers may be included. Alternatively, an additional operation of receiving data from external sources for communication to any of the plurality of portal access controllers may be performed. As such, data received from external sources may be received from an obsolescence database, an inventory database, or a supply and demand application. The data received from the external sources may be received subsequent to a search for information related to the case.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for managing decision support related events, cases, and solutions relating to inventory item obsolescence and mitigation, the system comprising:
    a control server;
    a plurality of network access stations associated with respective units within an organization; and
    a plurality of network access controllers, each network accessc controller configured to control access by a respective network access station to the control server via one or more security functions,
    wherein the control server comprises a processor and memory configured via execution of stored instructions to define:
    a plurality of case management elements, and
    a plurality of portal access controllers, each portal access controller configured to control access by a respective user,
    wherein each of the case management elements is in communication with at least an associated one of the corresponding plurality of portal access controllers to enable receipt of case information for an inventory item, each of the portal access controllers being associated with a corresponding one of a plurality of units within the organization, and each of the case management elements includes at least a corresponding one of a plurality of solution elements, each of the solution elements being configured to receive and store solution information regarding an inventory item obsolescence and mitigation strategy from the at least one corresponding portal access controller and to only enable modification of the solution information stored by a respective solution element by a portal access controller associated with a unit from which the solution information is received while enabling access to view the solution information by each other one of the solution elements,
    wherein a solution element of a respective case management element is configured to receive a search query regarding an inventory item, to communicate the search query to the solution elements of other case management elements and to then receive solution information regarding an inventory item obsolescence and mitigation strategy from a solution element of another case management element regarding the inventory item, the solution element of the respective case management element also being configured to modify the solution information that was received and to then save a modified representation of the solution information in conjunction with the respective case management element,
    wherein the solution elements of the plurality of case management elements are configured to receive solution information regarding an inventory item obsolescence and mitigation strategy for the same inventory item from the portal access controllers associated with a plurality of different units within the organization,
    wherein the solution information comprises data regarding a decision support related event relating to an inventory item obsolescence and mitigation strategy associated with a case associated with the corresponding unit.

2. The system of claim 1, wherein each of the case management elements is configured to enable access to the case only to a portal access controller associated with the corresponding unit that originated the case.

3. The system of claim 1, wherein each of the case management elements further includes a corresponding inventory element configured to communicate decision support data related to a particular case to each other inventory element of other case management elements.

4. The system of claim 3, wherein each corresponding inventory or solution element is configured to communicate with at least one of:
    an external obsolescence database;
    an external inventory database; or
    an external supply and demand application.

5. The system of claim 4, wherein the solution information comprises mitigation strategy information related to a supply and demand problem solution.

6. The system of claim 4, wherein each corresponding inventory element is configured to receive a user query for information related to a particular inventory item associated with the case.

7. The system of claim 3, wherein each of the inventory elements is configured to receive qualification data for communication to each other inventory element.

8. The system of claim 1, wherein each of the case management elements is configured to receive a mass input of a plurality of cases and associated solution information.

9. The system of claim 1, wherein each case management element is configured to limit access to the case information to only users associated with the unit corresponding to the portal access controller via which the case information was received.

10. A method for managing parts obsolescence related events and solutions relating to inventory item obsolescence and mitigation, the method comprising:
    controlling access to a control server with a plurality of network access controllers, each network access controller configured to control access by a respective network access station to the control server via one or more security functions;

receiving data related to a case at the control server from a portal access controller of origin, the portal access controller of origin being one of a plurality of portal access controllers that are each associated with a corresponding one of a plurality of units within an organization and that are configured to control access by a respective user, the case being associated with the corresponding unit and including case information for an inventory item, wherein the portal access controller of origin receives the data relating to the case from a respective network access station associated with the corresponding unit within the organization via a respective network access controller;

receiving and storing solution information related to the case regarding an inventory item obsolescence and mitigation strategy from the portal access controller of origin, wherein storing the solution information comprises storing the solution information with a solution element of a case management element associated with a respective unit of the organization, the solution information being data regarding a decision support related event associated with the case associated with the corresponding unit, wherein receiving the solution information comprises receiving solution information regarding an inventory item obsolescence and mitigation strategy for the same inventory item from the portal access controllers associated with a plurality of different units within the organization;

enabling modification of the solution information stored by a respective solution element only by a portal access controller associated with the corresponding unit while enabling access to view the solution information related to the case by any others among the plurality of portal access controllers;

providing for a solution element of a respective case management element to be configured to receive a search query regarding an inventory item, to communicate the search query to the solution elements of other case management elements and to then receive solution information regarding an inventory item obsolescence and mitigation strategy from a solution element of another case management element regarding the inventory item; and providing for the solution element of the respective case management element to be configured to modify the solution information that was received and to then save a modified representation of the solution information in conjunction with the respective case management element, wherein the solution information comprises data regarding a decision support related event relating to an inventory item obsolescence and mitigation strategy associated with a case associated with the corresponding unit.

11. The method of claim 10, wherein receiving data further comprises receiving case management data from the portal access controller of origin that is thereafter only accessible by the portal access controller of origin.

12. The method of claim 10, wherein communicating the solution information comprises communicating the solution information in response to a search conducted at another portal access controller among the plurality of portal access controllers.

13. The method of claim 10, further comprising receiving data from external sources for communication to any of the plurality of portal access controllers.

14. The method of claim 13, wherein receiving data from external sources comprises receiving data from at least one of:
   an obsolescence database;
   an inventory database; or
   a supply and demand application.

15. The method of claim 13, further comprising searching for information related to the case from the external sources.

16. The method of claim 10, further comprising limiting access to the case information to only users associated with the unit corresponding to the portal access controller via which the case information was received.

17. A computer program product for managing decision support related events and solutions relating to inventory item obsolescence and mitigation, the computer program product comprising at least one computer-readable storage medium having computer-readable program code portions stored therein, the computer-readable program code portions comprising:

a first executable portion for controlling access to a control server, wherein the first executable portion is implemented by a plurality of network access controllers that are each configured to control access by a respective network access station to the control server via one or more security functions;

a second executable portion for receiving data related to a case at the control server from a portal access controller of origin, the portal access controller of origin being one of a plurality of portal access controllers that are each associated with a corresponding one of a plurality of units within an organization and that are configured to control access by a respective user, the case being associated with the corresponding unit and including case information for an inventory item, wherein the portal access controller of origin receives the data relating to the case from a respective network access station associated with the corresponding unit within the organization via a respective network access controller;

a third executable portion for receiving and storing solution information related to the case regarding an inventory item obsolescence and mitigation strategy from the portal access controller of origin, the solution information being data regarding a decision support related event associated with the case associated with the corresponding unit, wherein the third executable portion is further configured to receive the solution information by receiving solution information regarding an inventory item obsolescence and mitigation strategy for the same inventory item from the portal access controllers associated with a plurality of different units within the organization;

a fourth executable portion for enabling modification of the solution information stored by a respective solution element only by a portal access controller associated with the corresponding unit while enabling access to view the solution information related to the case by any others among the plurality of portal access controllers;

a fifth executable portion for providing for a solution element of a respective case management element to be configured to receive a search query regarding an inventory item, to communicate the search query to the solution elements of other case management elements and to then receive solution information regarding an inventory item obsolescence and mitigation strategy from a solution element of another case management element regarding the inventory item; and a sixth executable portion for providing for the solution element of the respective case management element to be configured to modify the solution information that was received and to then save a modified representation of the solution information in conjunction with the respective case management element, wherein the solution information comprises data regarding a decision support related event relating to an inventory item obsolescence and mitigation strategy associated with a case associated with the corresponding unit.

18. The computer program product of claim 17, wherein the second executable portion includes instructions for receiving case management data from the portal access controller of origin that is thereafter only accessible by the portal access controller of origin.

19. The computer program product of claim 17, wherein the fourth executable portion includes instructions for communicating the solution information in response to a search conducted at another portal access controller among the plurality of portal access controllers.

20. The computer program product of claim 17, further comprising a fifth executable portion for receiving data from external sources for communication to any of the plurality of portal access controllers.

21. The computer program product of claim 20, wherein the second executable portion includes instructions for receiving data from at least one of:
an obsolescence database;
an inventory database; or
a supply and demand application.

22. The computer program product of claim 17, wherein the computer-readable program code portions further comprise an executable portion configured to limit access to the case information to only users associated with the unit corresponding to the portal access controller via which the case information was received.

* * * * *

UNITED STATES PATENT AND TRADEMARK OFFICE
CERTIFICATE OF CORRECTION

PATENT NO.       : 9,898,702 B2
APPLICATION NO.  : 11/554784
DATED            : February 20, 2018
INVENTOR(S)      : Owens et al.

Page 1 of 1

It is certified that error appears in the above-identified patent and that said Letters Patent is hereby corrected as shown below:

In the Claims

Column 13,
Line 42, Claim 1, "accessc controller" should read --access controller--.

Signed and Sealed this
Tenth Day of July, 2018

Andrei Iancu
*Director of the United States Patent and Trademark Office*